United States Patent
Vendas Da Costa et al.

(10) Patent No.: US 11,475,551 B2
(45) Date of Patent: Oct. 18, 2022

(54) SYSTEM AND METHOD OF OPERATION FOR REMOTELY OPERATED VEHICLES FOR AUTOMATIC DETECTION OF STRUCTURE INTEGRITY THREATS

(71) Applicant: Abyssal S.A., Matosinhos (PT)

(72) Inventors: Pedro Miguel Vendas Da Costa, Oporto (PT); Manuel Alberto Parente Da Silva, Maia (PT)

(73) Assignee: ABYSSAL S.A., Matosinhos (PT)

( * ) Notice: Subject to any disclaimer, the term of this patent is extended or adjusted under 35 U.S.C. 154(b) by 0 days.

(21) Appl. No.: 17/266,045

(22) PCT Filed: Aug. 8, 2018

(86) PCT No.: PCT/IB2018/055977
§ 371 (c)(1),
(2) Date: Feb. 4, 2021

(87) PCT Pub. No.: WO2020/030949
PCT Pub. Date: Feb. 13, 2020

(65) Prior Publication Data
US 2021/0366097 A1    Nov. 25, 2021

(51) Int. Cl.
*G06T 7/00* (2017.01)
*G06T 7/11* (2017.01)
(Continued)

(52) U.S. Cl.
CPC ............ *G06T 7/0002* (2013.01); *B63G 8/001* (2013.01); *G05D 1/0038* (2013.01);
(Continued)

(58) Field of Classification Search
CPC ........ G06T 2207/30184; G06T 7/0002; G05D 1/0044; B63G 8/001; B63G 2008/004; B63G 2008/005; B63G 2008/007
See application file for complete search history.

(56) References Cited

U.S. PATENT DOCUMENTS 10,007,269 B1    6/2018 Gray
10,394,327 B2    8/2019 Chizeck
(Continued)

FOREIGN PATENT DOCUMENTS

EP    0674977 A1    10/1995
FR    2949167 A1    2/2011
WO    2013/068821 A2    5/2013

OTHER PUBLICATIONS

Baraldi et al., "LAMV: Learning to align and match videos with kernelized temporal layers", Facebook AI Research, Jun. 19, 2018, URL: https://ai.facebook.com/results/?content_types%5B0%5D=publication&page=10&years%5B0%5D=2018 (Year: 2018).*
(Continued)

*Primary Examiner* — Diane M Wills
(74) *Attorney, Agent, or Firm* — Baker Botts L.L.P.

(57) ABSTRACT

The present invention provides a system and method of automatic detection of structure integrity threats. A threat detection engine detects integrity threats in structures, such as underwater structures, and segments the structures in an image using convolutional neural networks ("CNN"). The threat detection engine may include a dataset module, a CNN training module, a segmentation map module, a semi-supervision module, and an efficiency module. The threat detection engine may train a deep learning model to detect anomalies in videos. To do so, a dataset module with videos may be used where the dataset module includes annotations detailing at what timestamps one or more anomalies are visible.

20 Claims, 14 Drawing Sheets

(51) Int. Cl.
| | |
|---|---|
| *G06T 15/20* | (2011.01) |
| *G06T 19/00* | (2011.01) |
| *B63G 8/00* | (2006.01) |
| *G05D 1/00* | (2006.01) |
| *G06N 3/08* | (2006.01) |
| *H04N 5/272* | (2006.01) |
| *H04N 7/18* | (2006.01) |

(52) U.S. Cl.
CPC .............. *G05D 1/0044* (2013.01); *G06N 3/08* (2013.01); *G06T 7/11* (2017.01); *G06T 15/20* (2013.01); *G06T 19/006* (2013.01); *H04N 5/272* (2013.01); *H04N 7/185* (2013.01); *B63G 2008/005* (2013.01); *G06T 2207/10016* (2013.01); *G06T 2207/20081* (2013.01); *G06T 2207/20084* (2013.01); *G06T 2207/30184* (2013.01)

(56) References Cited

U.S. PATENT DOCUMENTS

| | | | |
|---|---|---|---|
| 2014/0316611 A1* | 10/2014 | Parente Da Silva | .. G06V 20/56 701/2 |
| 2019/0147220 A1 | 5/2019 | Mccormac et al. | |
| 2020/0041276 A1 | 2/2020 | Chakravarty et al. | |
| 2020/0292817 A1 | 9/2020 | Jones | |
| 2021/0304430 A1 | 9/2021 | Vendas Da Costa | |
| 2022/0005332 A1 | 1/2022 | Metzler | |

OTHER PUBLICATIONS

International Search Report and Written Opinion received for PCT Patent Application No. PCT/US2018/055979, dated Mar. 7, 2019; 13 pages, dated Mar. 7, 2019.

International Search Report and Written Opinion received for PCT Patent Application No. PCT/US2018/055976, dated Feb. 22, 2019; 11 pages, dated Feb. 22, 2019.

International Search Report and Written Opinion received for PCT Patent Application No. PCT/US2018/055977, dated Apr. 9, 2019; 21 pages, dated Apr. 9, 2019.

International Search Report and Written Opinion received for PCT Patent Application No. PCT/US2018/055978, dated Feb. 22, 2019; 12 pages, dated Feb. 22, 2019.

Kalwa, J. et al., "The MORPH Project: Actual Results," Oceans 2015—Genova, IEEE, May 18, 2015, 8 pages, May 18, 2015.

Eckstein, Sebastian et al., "Towards Innovative Approaches of Team-Oriented Mission Planning and Mission Languages for Multiple Unmanned Marine Vehicles in Event-Driven Mission," MTS/IEEE Oceans, Bergen, Jun. 2013, 8 pages, Jun. 2013.

Vijayanarasimhan, Sudheendra, et al., "SfM-Net: Learning of Structure & Motion from Video," retrieved from the internet on Feb. 21, 2019, URL: https://arxiv.org/pdf/1704.07804.pdf, 5 pages, Feb. 21, 2019.

Bruno, Fabio, et al., "Virtual and Augmented Reality Tools to Improve the Exploitation of Underwater Archaeological Sites by Diver and Non-diver Tourists," International Conference on Simulation, Modeling, and Programming for Autonomous Robots, SIMPAR 2010, Oct. 31, 2016, 12 pages, Oct. 31, 2016.

Marchand, Eric, et al., "Pose Estimation for Augmented Reality: A Hands-On Survey," IEEE Transactions on Visualization and Computer Graphics, vol. 22, No. 12, Dec. 1, 2016, 19 pages, Dec. 1, 2016.

Vlahakis, Vassilio et al., "Archeoguide: an augmented reality guide for archaeological sites," IEEE Computer Graphics and Applications, vol. 22, No. 5, Sep. 1, 2002, 9 pages, Sep. 1, 2002.

Sharma, Ojaswa et al., "Navigation in AR based on digital replicas," The Visual Computer, Springer, Berlin, DE, vol. 34, No. 6, May 2, 2018, 12 pages, May 2, 2018.

Reitmayr, Gerhard et al., "Going out," Mixed and Augmented Reality, ISMAR 2006. IEEE/ACM International Symposium On, IEEE, PI, Oct. 22, 2006 , 10 pages, Oct. 22, 2006.

Tzafestas, Costas S., "Virtual and Mixed Reality in Telerobotics: A Survey," Industrial Robotics—Programming, Simulation and Application, Jan. 1, 2006, 34 pages, Jan. 1, 2006.

O'Byrne, Michael et al., "Semantic Segmentation of Underwater Imagery Using Deep Networks Training in Synthetic Imagery," Journal of Marine Science and Engineering, vol. 6, No. 3, Aug. 3, 2018, 15 pages, Aug. 3, 2018.

Choi, S.K., et al., "Distributed Virtual Environment Collaborative Simulator for Underwater Robots," Proceedings of the 2000 IEEE/RSJ International Conference on Intelligent Robots and Systems, Oct. 2000, 6 pages, Oct. 2000.

\* cited by examiner

SYSTEM AND METHOD OF OPERATION FOR REMOTELY OPERATED VEHICLES FOR AUTOMATIC DETECTION OF STRUCTURE INTEGRITY THREATS

CROSS-REFERENCE TO RELATED APPLICATIONS

This application is a U.S. National Stage Application of International Application No. PCT/IB2018/055977 filed Aug. 8, 2018, which designates the United States.

The disclosures of published patent documents referenced in this application are hereby incorporated in their entireties by reference into this application in order to more fully describe the state of the art to which this invention pertains.

The present invention relates to a system of operation for remotely operated vehicles ("ROV"), and methods for its use. In particular, the present invention provides a system and method of operation for ROVs with automatic detection of structure integrity threats.

BACKGROUND OF THE INVENTION

Exploration of the last frontier on earth, the sea, is largely driven by the continuing demand for energy resources. Because humans are not able to endure the pressures induced at the depths at which energy reconnaissance occurs, we have become increasingly reliant upon technology such as autonomous vehicles and ROV technology. The future of the exploration of the oceans is only as fast, reliable and safe as the available technology. Thus, new innovations in exploration are needed.

SUMMARY OF THE INVENTION

Failure to maintain Oil & Gas (O&G) underwater structures in good state may pose serious risks for the environment, loss of production, and higher costs of repair and replacement. Operators may be required to guarantee that structures are in a safe condition.

For instance, it is required to periodically inspect pipelines for damage. This damage might originate from object collisions or natural causes. When an integrity threat is detected, the pipeline needs to be repaired or, in more extreme cases, replaced.

Another even broader example is the inspection of sacrificial anodes. These are made of highly active metals and are used to protect less active metal surfaces from corroding. The sacrificial anode is consumed instead of the metal surface it is protecting and, therefore, the sacrificial anodes need to be periodically replaced. ROVs are used to visually inspect underwater structures. To do that, ROVs film the structures in need of inspection and trained human operators attempt to detect potential integrity threats in the video. Thus, a system is needed that can: 1) detect integrity threats in an underwater structure; and 2) segment the structure in the image.

This disclosure provides systems and methods relating to the operation of ROVs with improved detection of structure integrity threats, in some embodiments the detection is automatic and is accomplished with the use of convolutional neural networks. Although embodiments and examples are provided in the context of undersea missions, one skilled in the art should appreciate that the aspects, features, functionalities, etc., discussed in this disclosure can also be extended to virtually any type of complex navigation project.

BRIEF DESCRIPTION OF THE DRAWINGS

The aforementioned and other aspects, features and advantages can be better understood from the following detailed description with reference to the accompanying drawings wherein.

DETAILED DESCRIPTION OF THE INVENTION

Figure 1A:
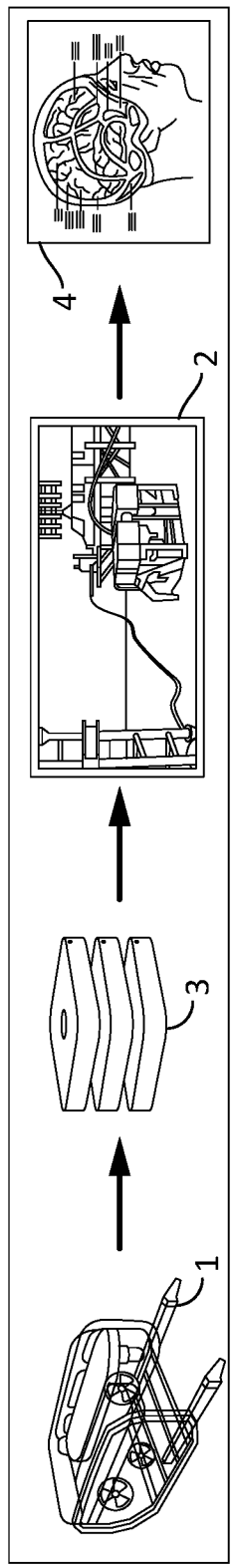
FIG. 1A shows a diagrammatic view of a system, according to some embodiments.

The invention provides a system for operating a remotely operated vehicle (ROV) comprising:
  a) a database module of 3D elements operable to represent objects disposed in an operation environment of the ROV;
  b) a virtual video generating module operable to generate a virtual video incorporating the 3D elements;
  c) a video camera mounted to the ROV operable to generate a real video of the operation environment of the ROV;
  d) a synchronizing module operable to synchronize an angle and position of a virtual camera with an angle and position of the video camera mounted to the ROV;
  e) a visualization engine operable to superimpose the real video on the virtual video to create hybrid 3D imagery; and
  f) a threat detection engine operable to detect an integrity threat in a structure from the hybrid 3D imagery and segment the structure in the hybrid 3D imagery, the threat detection engine comprising: a dataset module; a convolutional neural network (CNN) training module; a segmentation map module; and an efficiency module.

The systems and methods described herein may further have one or more of the following additional features, which may be combined with one another or any other feature described herein unless clearly mutually exclusive.

The dataset module may include annotations detailing at what timestamps one or more anomalies are visible.

The CNN training module may accept an input image and output a logic high if a visible anomaly is detected and output a logic low otherwise.

The CNN training module may comprise a plurality of stacked convolutional layers, where each subsequent stacked convolutional layer of the plurality of stacked convolutional layers includes a larger region of the input image.

The CNN training model may further comprise a coarse structure segmentation map.

The segmentation map module may generate a segmentation map dataset using pixel-level segmentations.

The segmentation map module may generate the pixel-level segmentations by projecting a 3D model of a visible structure into the ROV's virtual camera.

The CNN training module may train a CNN model to minimize a loss function.

The CNN training module may (i) use a loss function L for data that contains both segmentation data and anomaly ground-truth data and (ii) use a loss function La for data that contains anomaly ground-truth data but not segmentation data.

The efficiency module may compute a binary mask m and, when all of m's elements are close to zero, the efficiency module may stop the threat detection engine from making further computations and generate an output that there are not structure anomalies.

The invention provides a system for undersea exploration comprising:
 a) a remote operated vehicle (ROV) comprising a camera for acquiring a real video;
 b) a networked operating system comprising a computer and computer executable software comprising a visualization engine and a threat detection engine;
 c) a database module of 3D elements operable to represent objects disposed in an operation environment of the ROV;
 d) a virtual video generating module operable to generate a virtual video incorporating the 3D elements;
 e) a video camera mounted to the ROV operable to generate a real video of the operation environment of the ROV;
 f) a synchronizing module operable to synchronize an angle and position of a virtual camera with an angle and position of the video camera mounted to the ROV;
 g) wherein the visualization engine is operable to superimpose the real video on the virtual video to create hybrid 3D imagery; and
 h) wherein the threat detection engine is operable to detect an integrity threat in a structure from the hybrid 3D imagery and segment the structure in the hybrid 3D imagery, the threat detection engine comprising: a dataset module; a convolutional neural network (CNN) training module; a segmentation map module; and an efficiency module; and
 i) a navigation interface configured to display the hybrid 3D imagery, the navigation interface comprising at least one networked monitor.

The dataset module may include annotations detailing at what timestamps one or more anomalies are visible.

The CNN training module may accept an input image and output a logic high if a visible anomaly is detected and output a logic low otherwise.

The CNN training module may comprise a plurality of stacked convolutional layers, wherein each subsequent stacked convolutional layer of the plurality of stacked convolutional layers includes a larger region of the input image.

The CNN training model may further comprise a coarse structure segmentation map.

The segmentation map module may generate a segmentation map dataset using pixel-level segmentations.

The segmentation map module may generate the pixel-level segmentations by projecting a 3D model of a visible structure into the ROV's virtual camera.

The invention also provides a method of operating a remotely operated vehicle (ROV) comprising:
 a) obtaining 3D data;
 b) storing 3D elements in a database module, the 3D elements representing objects disposed in the ROV's operation environment and comprising the 3D data;
 c) generating a virtual video of the 3D elements;
 d) synchronizing an angle and position of a virtual camera with an angle and position of a video camera mounted to the ROV; and
 e) aligning and superimposing a virtual video element with a real video element to create hybrid 3D imagery;
 f) segmenting a structure from the hybrid 3D imagery; and
 g) detecting an integrity threat in the structure from the hybrid 3D imagery.

A method may further comprise detecting an integrity threat that further includes:
 a) training a CNN model; and
 b) generating segmentation maps.

A method may further comprise detecting an integrity threat that further includes:
 a) generating a segmentation map dataset using pixel-level segmentations; and
 b) computing a binary mask m; and
 c) stopping further computations when all of m's elements are close to zero.

The invention also provides a computer program product, stored on a computer-readable medium, for implementing any method according to invention as described herein.

As mentioned supra, various features and functionalities are discussed herein by way of examples and embodiments in a context of ROV navigation and threat detection for use in undersea exploration. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Definitions

The following terms are defined as follows:

3D elements; 3D objects—Data defining three-dimensional shapes, obtained by modeling sonar-derived input or user-determined input.

Abstraction; layer of abstraction—A characteristic of executable software, wherein differing data formats are standardized into a common format such that components are made compatible.

Data engine—A collection of modules, according to an embodiment of this invention, which is responsible for at least the acquisition, storing and reporting of data collected over the course of a ROV mission.

Fail state—A state, defined by a user or by a standard, wherein the functionality of the system, according to some embodiments of the invention, has decreased to an unacceptable level.

Luminance threshold—A system-determined value of RGB (Red, Green, Blue) pixel color intensity which defines a visible but transparent state for the images depicted by a digital image output device.

Module—A combination of at least one computer processor, computer memory and custom software that performs one or more defined functions.

Navigation engine—A collection of modules, according to some embodiments of this invention, which is responsible for making the Navigation Interface interactive, and for producing data for displaying on the Navigation Interface.

Positioned; geopositioned; tagged—Having a location defined by the Global Positioning System of satellites and/or acoustic or inertial positioning systems, and optionally having a location defined by a depth below sea level.

ROV—A remotely operated vehicle; often an aquatic vehicle. Although for purposes of convenience and brevity ROVs are described herein, nothing herein is intended to be limiting to only vehicles that require remote operation. Autonomous vehicles and semi-autonomous vehicles are within the scope of this disclosure.

Threat Detection Engine—A collection of modules, according to some embodiments, which is responsible for detecting integrity threats to structures and segmenting the structure in an image.

Visualization engine—A collection of modules, according to an embodiment of this invention, which is responsible for producing the displayed aspect of the navigation interface.

System

Hardware and Devices

Referring now to the drawings, wherein like reference numerals designate identical or corresponding parts throughout the several views, FIG. 1A diagrammatically depicts a system according to an embodiment of the invention. This system includes an ROV and its associated instrumentation 1, an operating system housed within computer hardware 3 and a user interface and its associated devices 2. The operating system 3 mediates interaction between the ROV 1 and the user 4, such that the user may submit commands and inquiries for information to the ROV 1, and obtain mechanical responses and data output from the ROV 1.

Figure 1B:
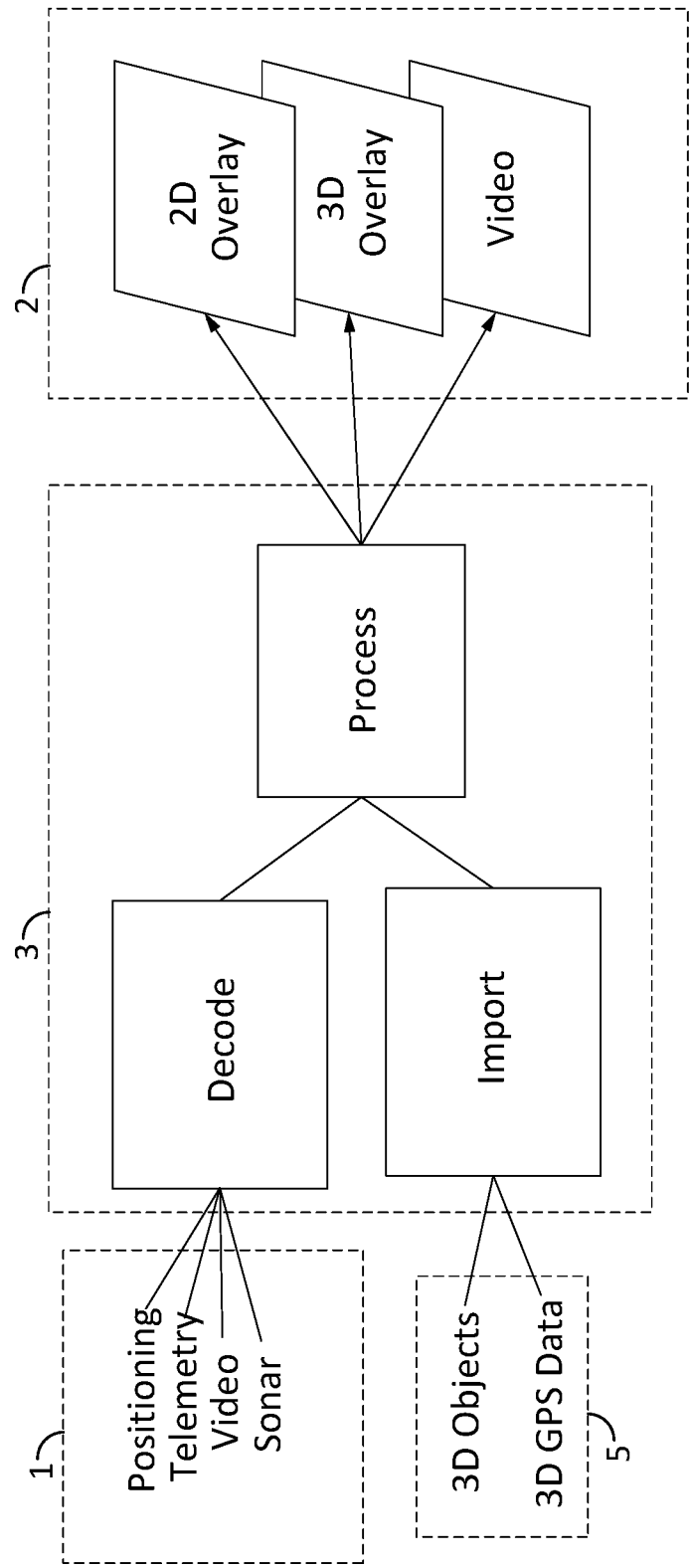
FIG. 1B shows a diagrammatic view of a system and its associated functions, according to some embodiments.

As seen from FIG. 1B, the operating system 3 may receive live information obtained by the ROV's 1 multibeam 3D real-time sonar, telemetry data, positioning data and video as well as programmed 3D objects from a database 5, and process that data to provide live 3D models of the environment for both augmented reality and full 3D rendering displayed at the user interface 2. The user interface 2 may also be used to display video obtained using the ROV's 1 digital instrumentation, including, for example, cameras and other sensors. The ROV 1 utilized in the system of the present invention is equipped with conventional instrumentation for telemetry and positioning, which are responsive to the commands mediated by the operating system 3.

In one embodiment of the invention, the hardware for the operating system 3 includes a high-end rack computer that can be easily integrated with any ROV control system. The several software modules that further define the operating system will be described in further detail infra.

Figure 2A:
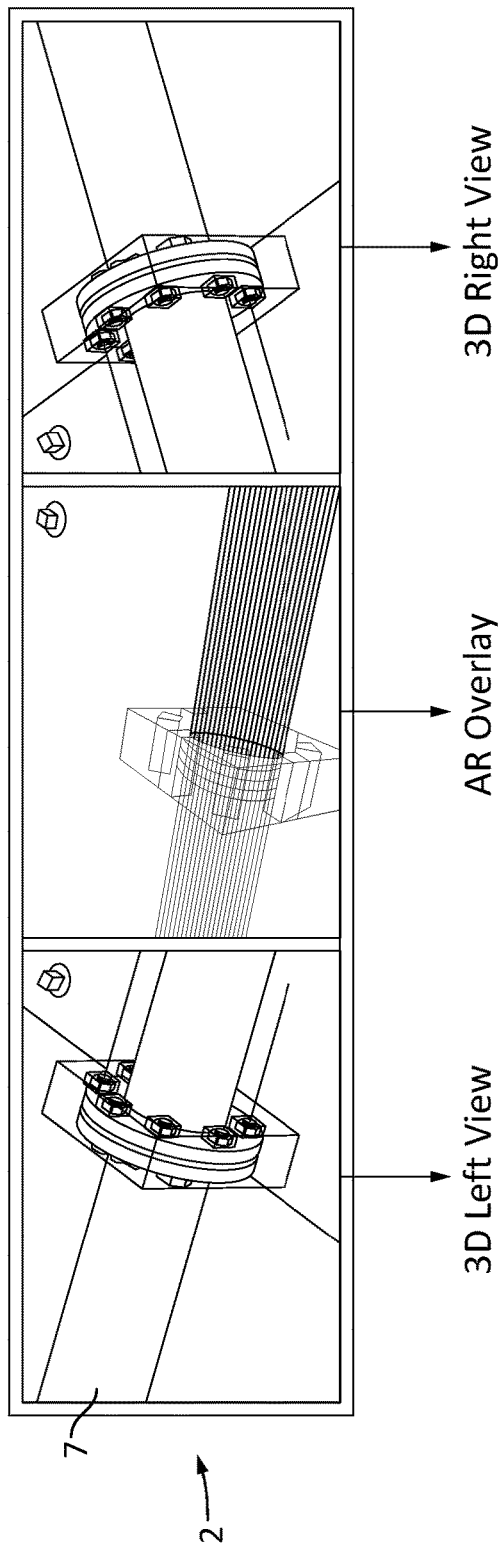
FIGS. 2A and 2B depict alternative views of a user interface of a system according to some embodiments.
Figure 2B:
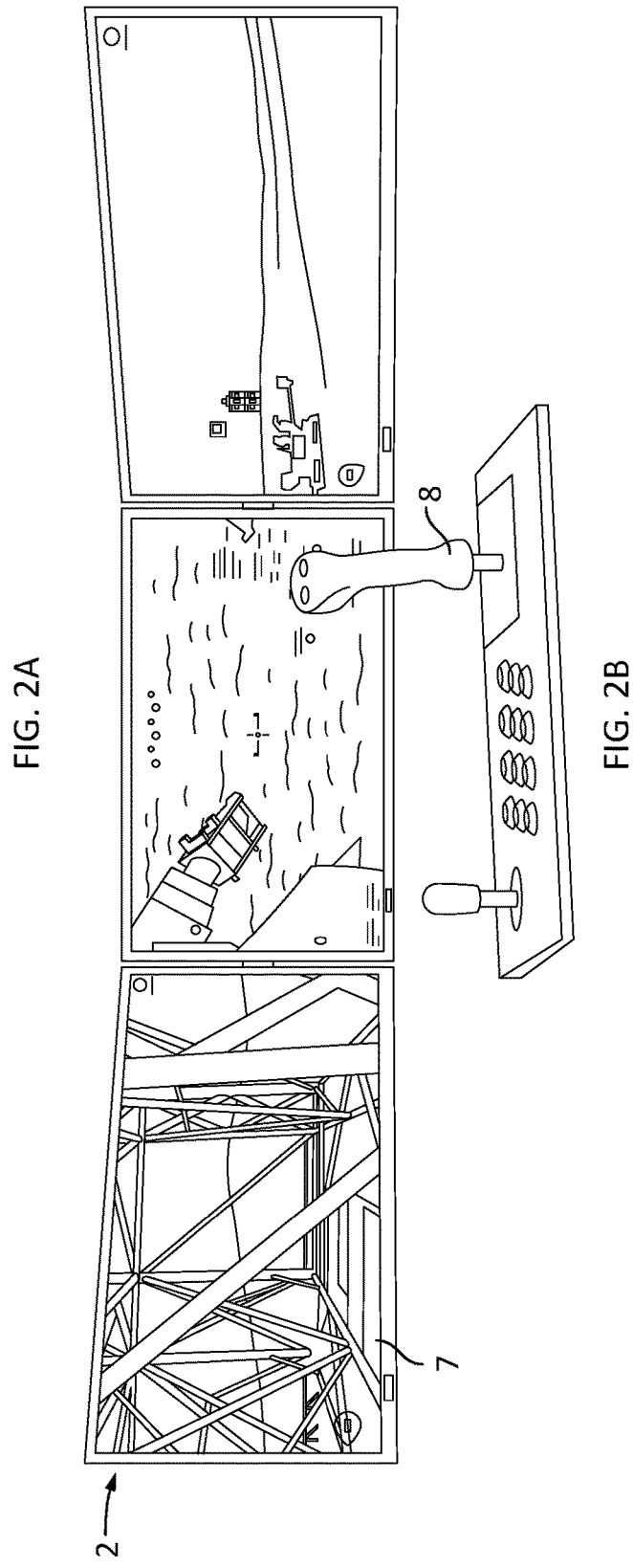

With reference to FIGS. 2A and 2B, the human-machine interface includes at least one monitor 7, and preferably three interactive monitors 7 for navigation. According to one embodiment shown in FIG. 2A, the center monitor 7 provides a video feed and augmented reality (AR), while the side monitors provide an expansion of the field of view of operation. In another aspect, the side monitors may allow the user to have a panoramic view of the ROV environment using full 3D visualization from the point of view of the ROV. As seen in FIG. 2B, the interaction between the user and the system may utilize joysticks 8, gamepads, or other controllers. In another embodiment, the user interface 2 may employ touch or multi-touch screen technology, audio warnings and sounds, voice commands, a computer mouse, etc.

Functional Modules

Rather than developing a different operating system for each brand and model of ROV 1, the embodiments described herein work by abstraction, such that the disclosed operating system 3 and associated hardware work the same way with all ROVs 1. For example, if one component delivers "$DBS, 14.0,10.3" as a depth and heading coordinates, and another component delivers "$HD,15.3,16.4" as heading and depth coordinates, these data strings are parsed into their respective variables: Depth1=14.0, Depth2=16.4, Heading1=16.4, Heading2=15.3. This parsing allows both system to work the same way, regardless of the data format details.

By developing a layer of abstraction of drivers for communication between the operating system 3 and the ROV hardware, the user 4 is provided with seamless data communication, and is not restricted to using particular ROV models. This abstraction further allows users 4 and systems 3 to communicate and network information between several systems and share information among several undersea projects. The use of a single system also allows for cost reduction in training, maintenance and operation of this system.

Figure 3A:
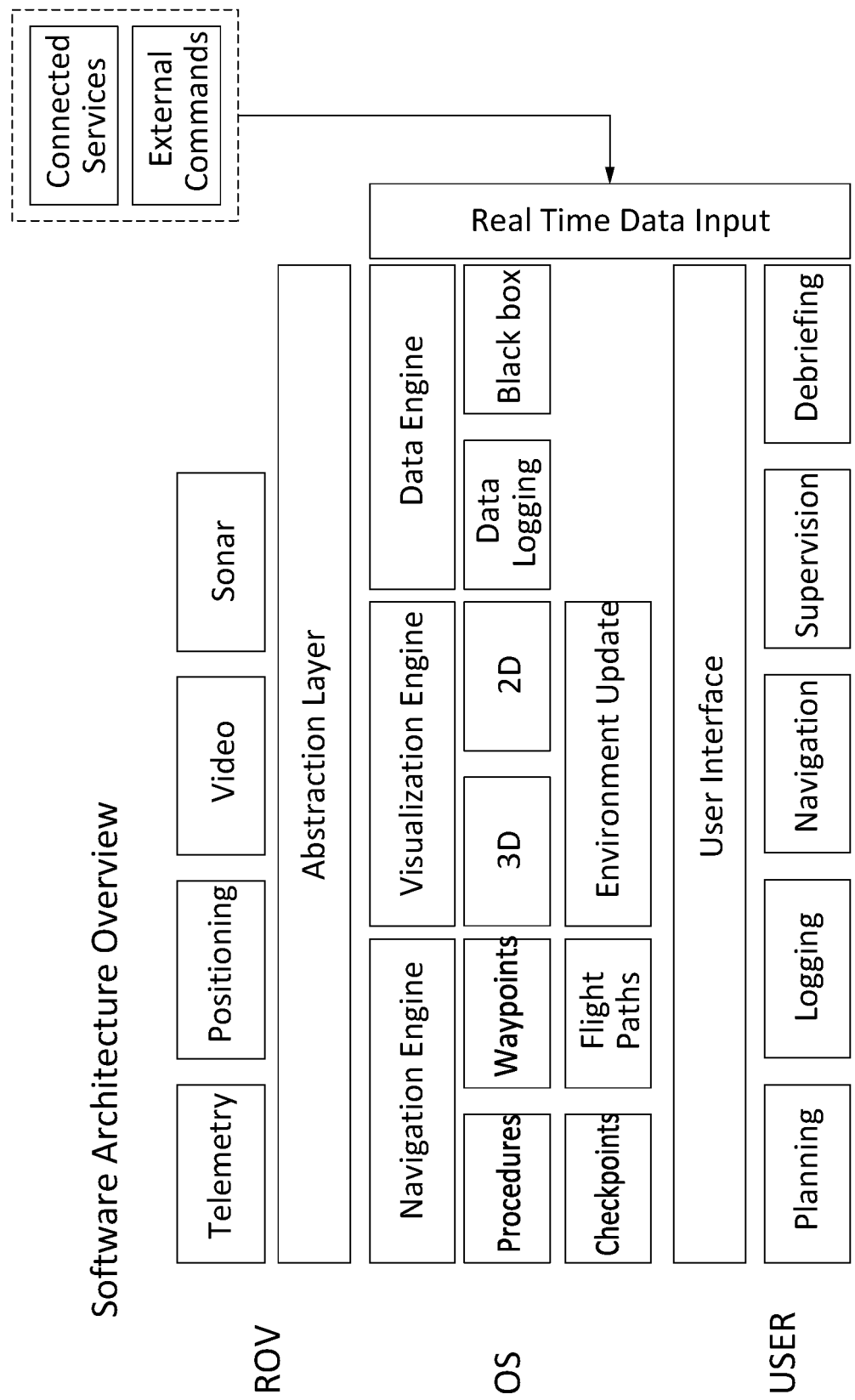
FIGS. 3A and 3B show software architecture overviews of a system, according to some embodiments.

FIG. 3A depicts a software architecture overview illustrating the component parts of the ROV 1, user interface 2 and operating system 3. Software counterparts are provided for the ROV's telemetry, positioning, video and sonar instrumentation. In order to implement user functions including planning, logging, navigation, supervision and debriefing, the operating system 3 provides a navigation engine, a visualization engine and a data engine. The operating system 3 is networked such that connected services and external command units can provide real-time data input. One of such external command units may be configured as a watchdog. The external watchdog system may perform periodic checks to determine whether the system is working properly or is in a fail state. If the system is in a fail state, the watchdog may change the monitors' inputs, or bypass them, to a conventional live video feed until the system is operating correctly.

Figure 3B:
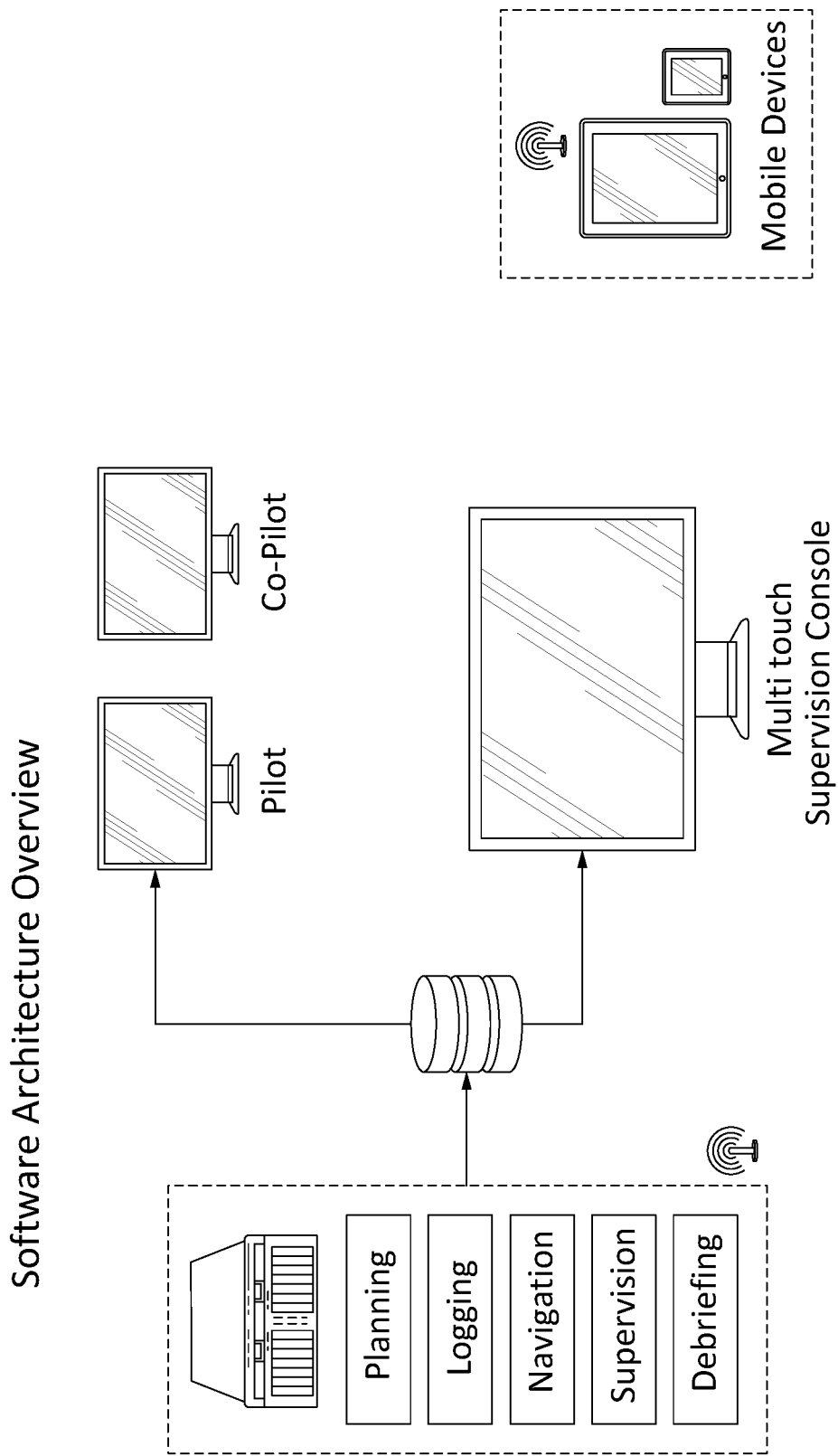
Figure 3C:
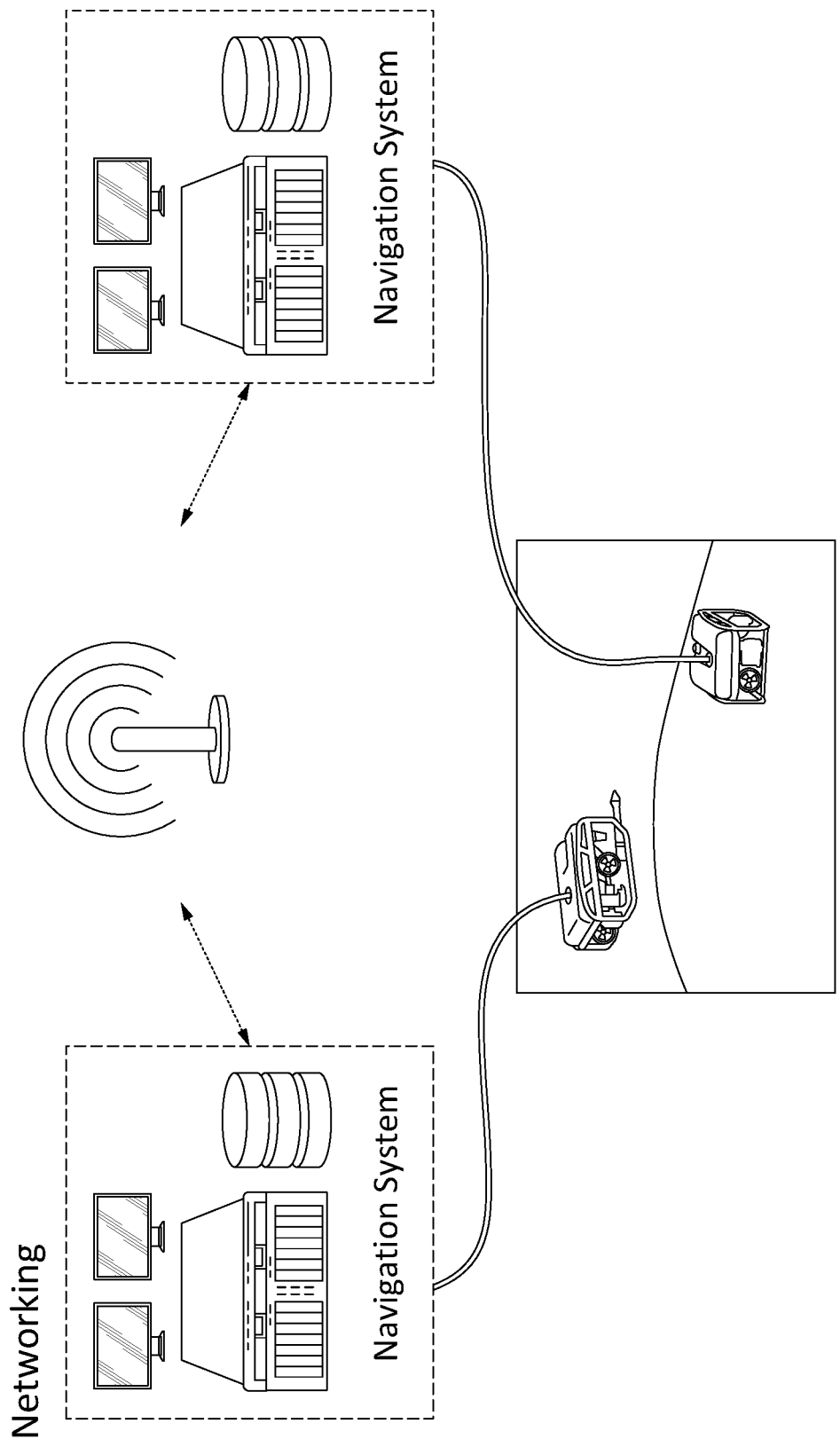
FIG. 3C is a diagrammatic illustration of networked systems, according to some embodiments.

FIG. 3B depicts a further software architecture overview illustrating that the operating system 3, which mediates the aforementioned user functions, is networked to provide communication between a multi touch supervision console and a pilot or pilots. FIG. 3C illustrates yet another level of connectivity, wherein the navigation system of a first ROV may share all of its dynamic data with the navigation system of another ROV over a network.

Visualization Engine

Figure 4:
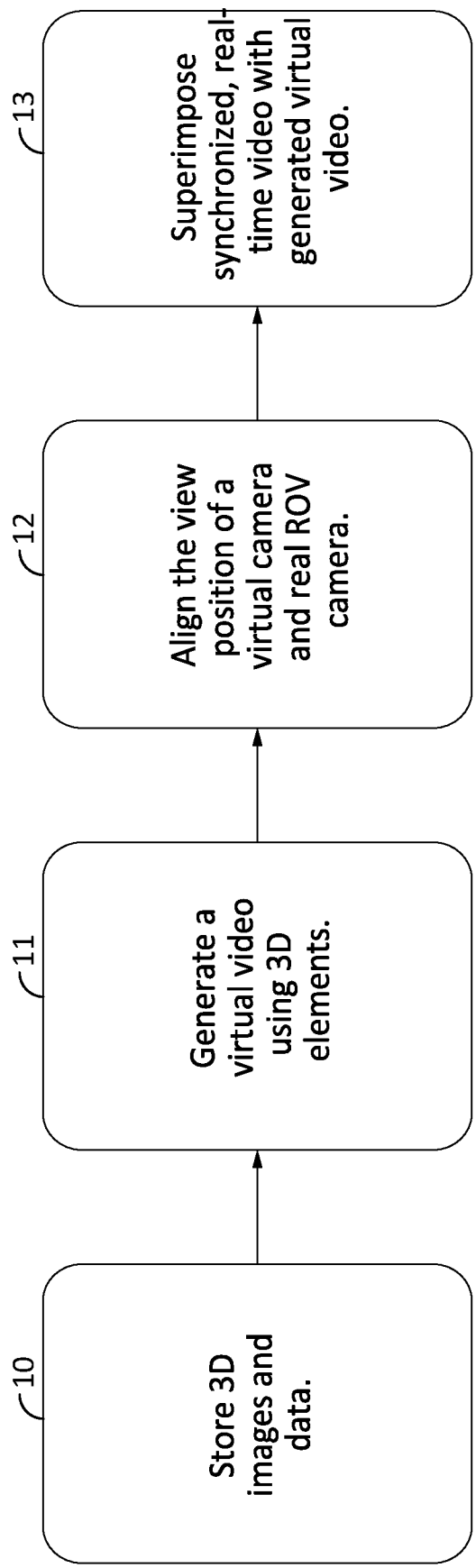
FIG. 4 depicts modules for achieving hybrid 3D imagery, and a method for their use, according to some embodiments.

As seen from FIGS. 1B and 3A, the operating system's visualization engine further includes modules for implementing 3D imagery, two-dimensional ("2D") imagery, and providing a real-time environment update. These modules are shown in FIG. 4, which illustrates in a stepwise fashion how the system operates in some embodiments to create superimposed hybrid 3D imagery.

A 3D database module 10 includes advanced 3D rendering technology to allow all the stages of ROV operation to be executed with reference to a visually re-created 3D deep-water environment. This environment is composed by the seabed bathymetry and modeled equipment, e.g., structures of ocean energy devices.

As discussed above, the main sources of image data may be pre-recorded 3D modeling of sonar data (i.e., computer-generated 3D video) and possibly other video data; live sonar data obtain in real time; video data obtained in real time; user-determined 3D elements; and textual or graphical communications intended to be displayed on the user interface screen. The geographical position and depth (or height) of any elements or regions included in the image data are known by GPS positioning, by use of acoustic and/or inertial positioning systems, and/or by reference to maps, and/or by other sensor measurements.

In some embodiments, a virtual video generation module 11 is provided for using the aforementioned stored 3D elements or real-time detected 3D elements to create a virtual video of such 3D elements. The virtual video generation module 11 may work in concert with a synchronization module 12.

The synchronization module 12 aligns the position of the virtual camera of the virtual video with the angle and position of a real camera on an ROV. According to some embodiments the virtual camera defines a field of view for the virtual video, which may extend, for example, between 45 and 144 degrees from a central point of view.

Figure 5A:
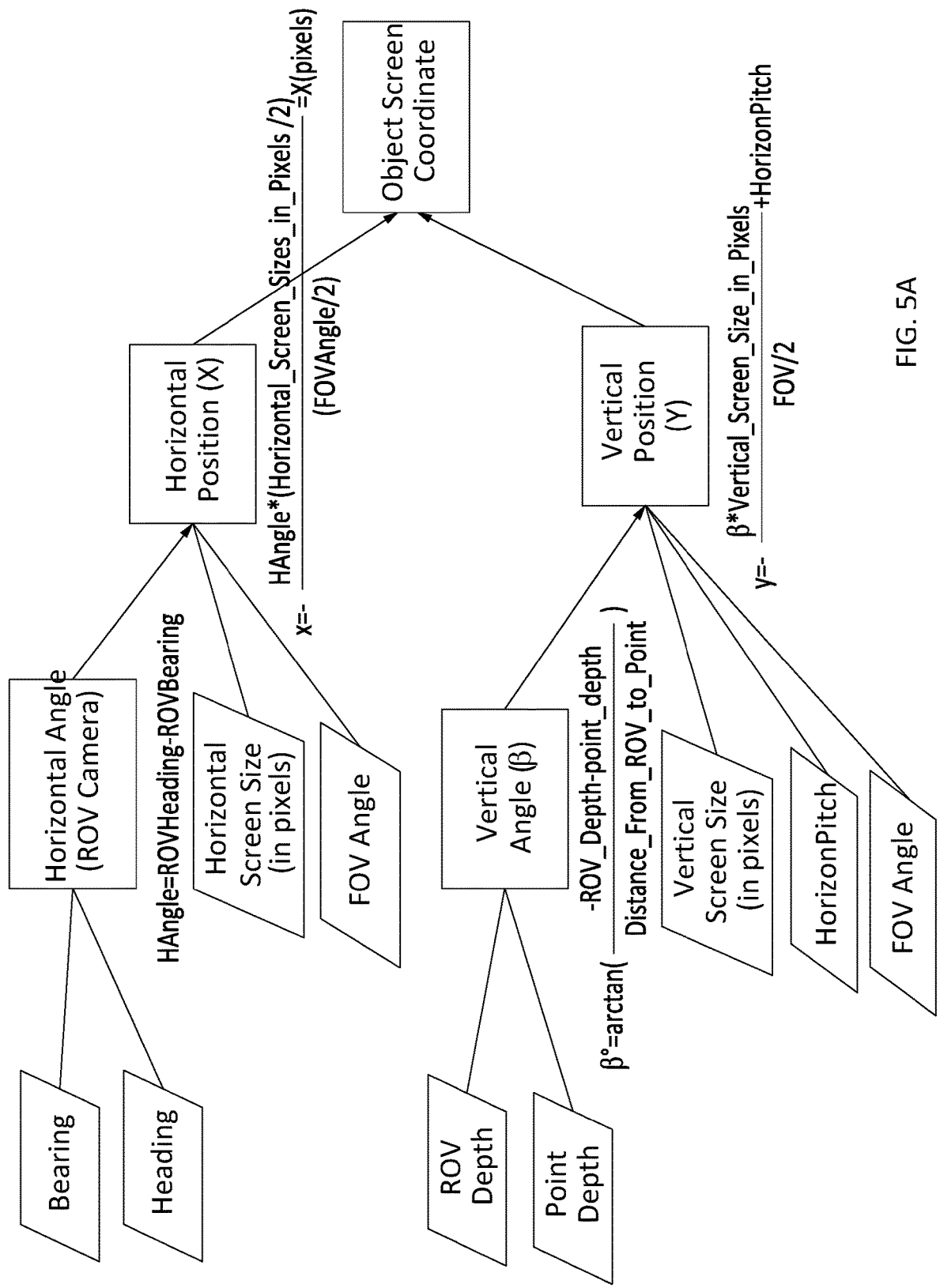
FIG. 5A illustrates calculations for aligning a virtual video and a real video, according to some embodiments.

As illustrated in FIG. 5A, the alignment of virtual and real camera angles may be accomplished by calculating the angle between the heading of the ROV and the direction of the camera field of view; calculating the angle between the vertical of the ROV and the direction of the camera field of view; and calculating the angle between the ROV and the geographic horizon. These calculated angles are then used to determine an equivalent object screen coordinate of the digital X-Y axis at determined time intervals or anytime a variable changes value.

Figure 5B:
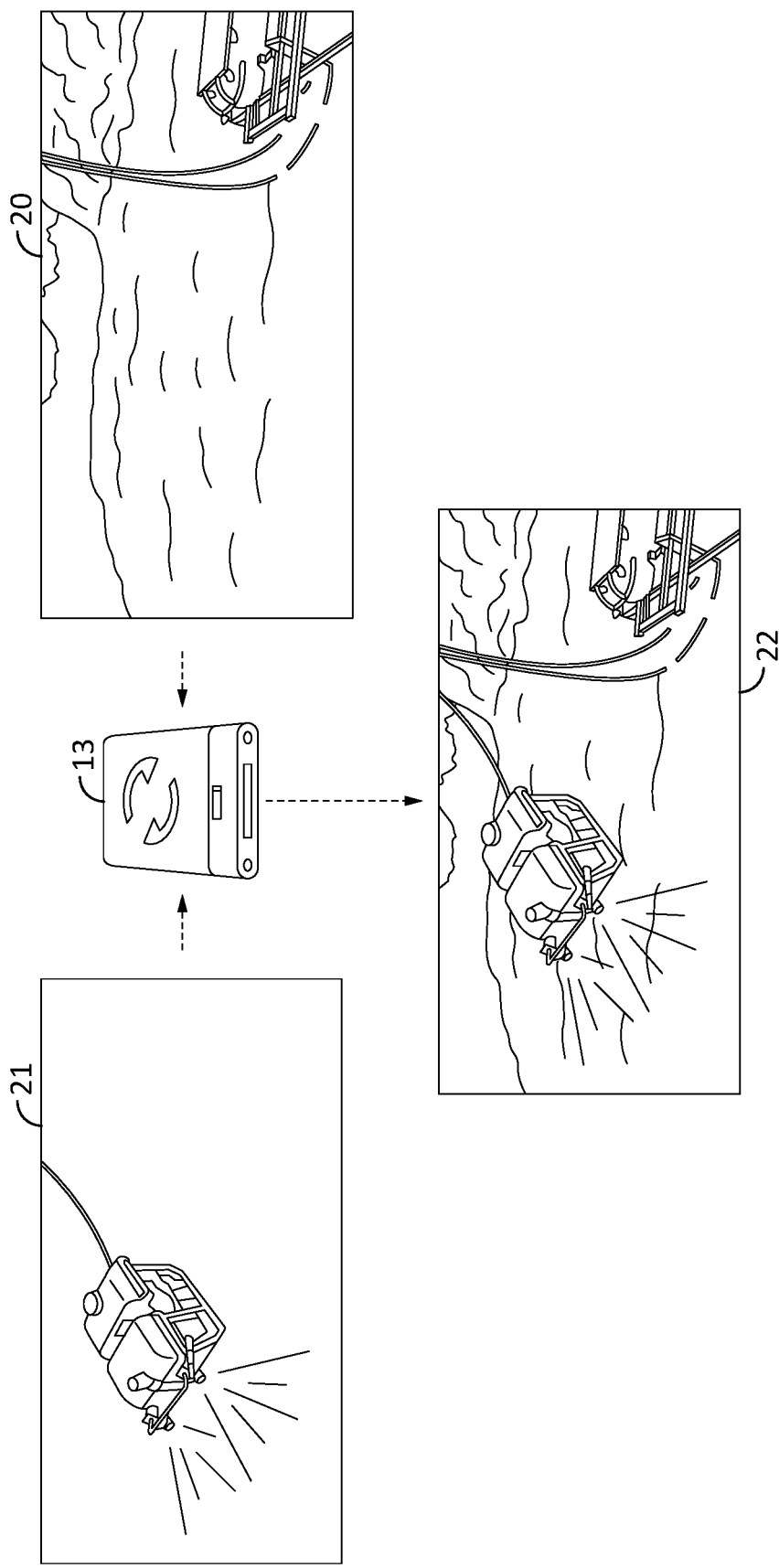
FIG. 5B illustrates hybrid 3D imagery obtained by superimposing a virtual video and a real video, according to some embodiments.

A superimposition module 13, whose function is additionally diagrammed in FIG. 5B, is provided for superimposing the generated virtual video 20 and the synchronized, real-time video 21 acquired by the ROV's digital camera. The result is hybrid superimposed 3D imagery 22, wherein the system effectively draws the generated 3D environment on top of the non-visible part of the video feed, thus greatly enhancing visibility for the ROV pilot. More specifically, the superimposition software divides the camera-feed video and the generated 3D video into several layers on the z-buffer of the 3D rendering system. This permits the flattening of the layers and their superimposition, which simulates spatial perception and facilitates navigation.

Yet another feature of the superimposition module 13 is that either one or both of the virtual 20 or real videos 21 may be manipulated, based upon a luminance threshold, to be more transparent in areas of lesser interest, thus allowing the corresponding area of the other video feed to show through. According to some embodiments, luminance in the Red-Green-Blue hexadecimal format may be between 0-0-0 and 255-255-255, and preferably between 0-0-0 and 40-40-40. Areas of lesser interest may be selected by a system default, or by the user. The color intensity of images in areas of lesser interest is set at the luminance threshold, and the corresponding region of the other video is set at normal luminance. For the example shown in FIG. 5B, the background of the virtual video 20 is kept relatively more transparent than the foreground. Thus, when the real video 21 is superimposed on the virtual 3D image 20, the real video 21 is selectively augmented primarily with the virtual foreground, which contains a subsea structure of interest.

Navigation Engine

The on-screen, 2D Navigation Interface for the ROV pilot involves superimposing geopositioned data or technical information on a 2D rendering system. Geopositioning or geo-tagging of data and elements is executed by reference to maps or to global positioning satellites. The resulting Navigation Interface, as seen in FIGS. 6A-6D, is reminiscent of aviation-type heads up display consoles. In the case of subsea navigation, the display is configured to indicate ROV 1 position based on known coordinates, and by using a sonar system that records 3D images from a ROV's position for later navigation. In this way, the embodiments described herein provide immersive visualization of ROV's operation.

Figure 6A:
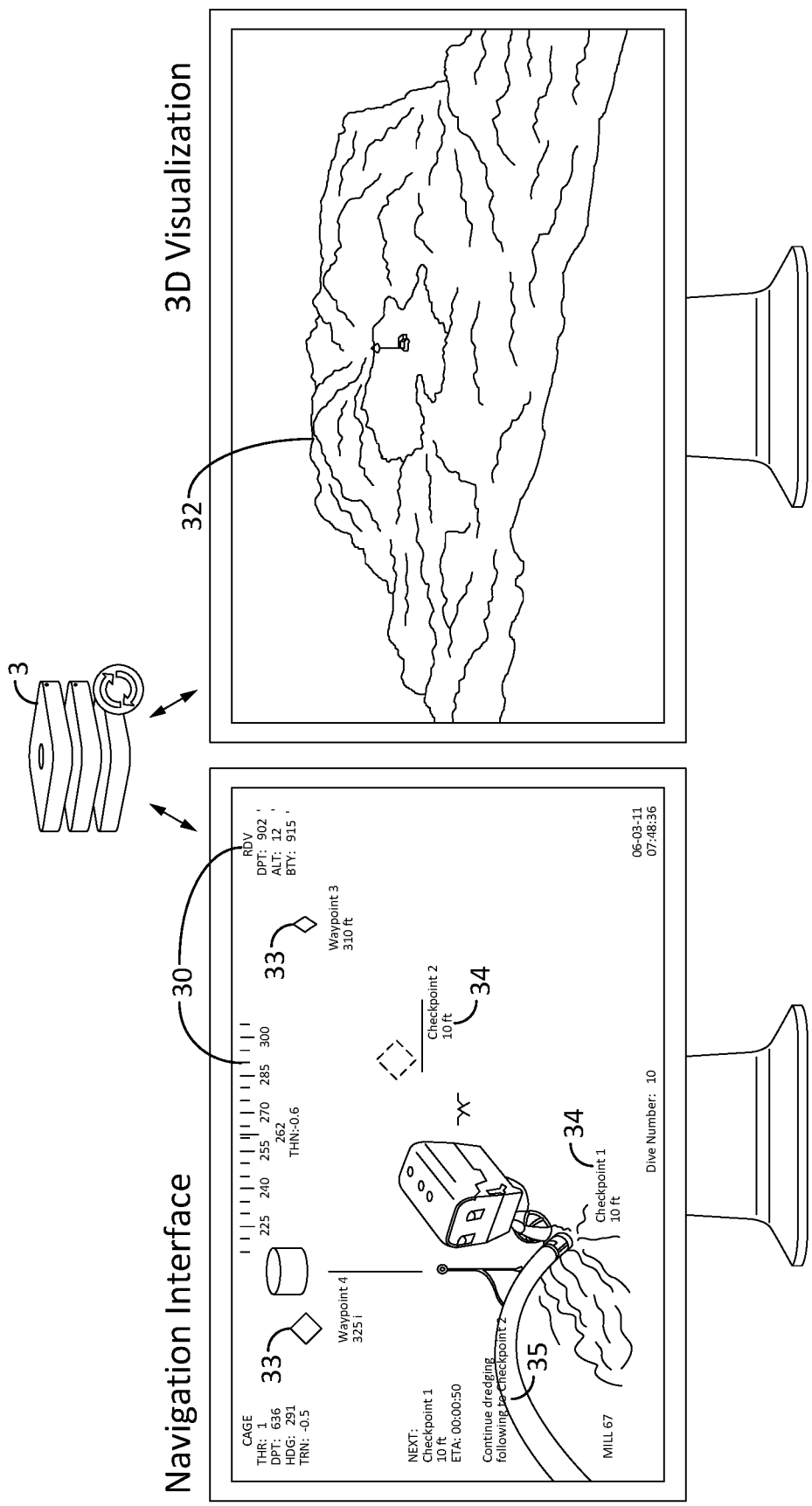
FIGS. 6A-6E depict several views of a navigation interface, according to some embodiments.
Figure 6B:
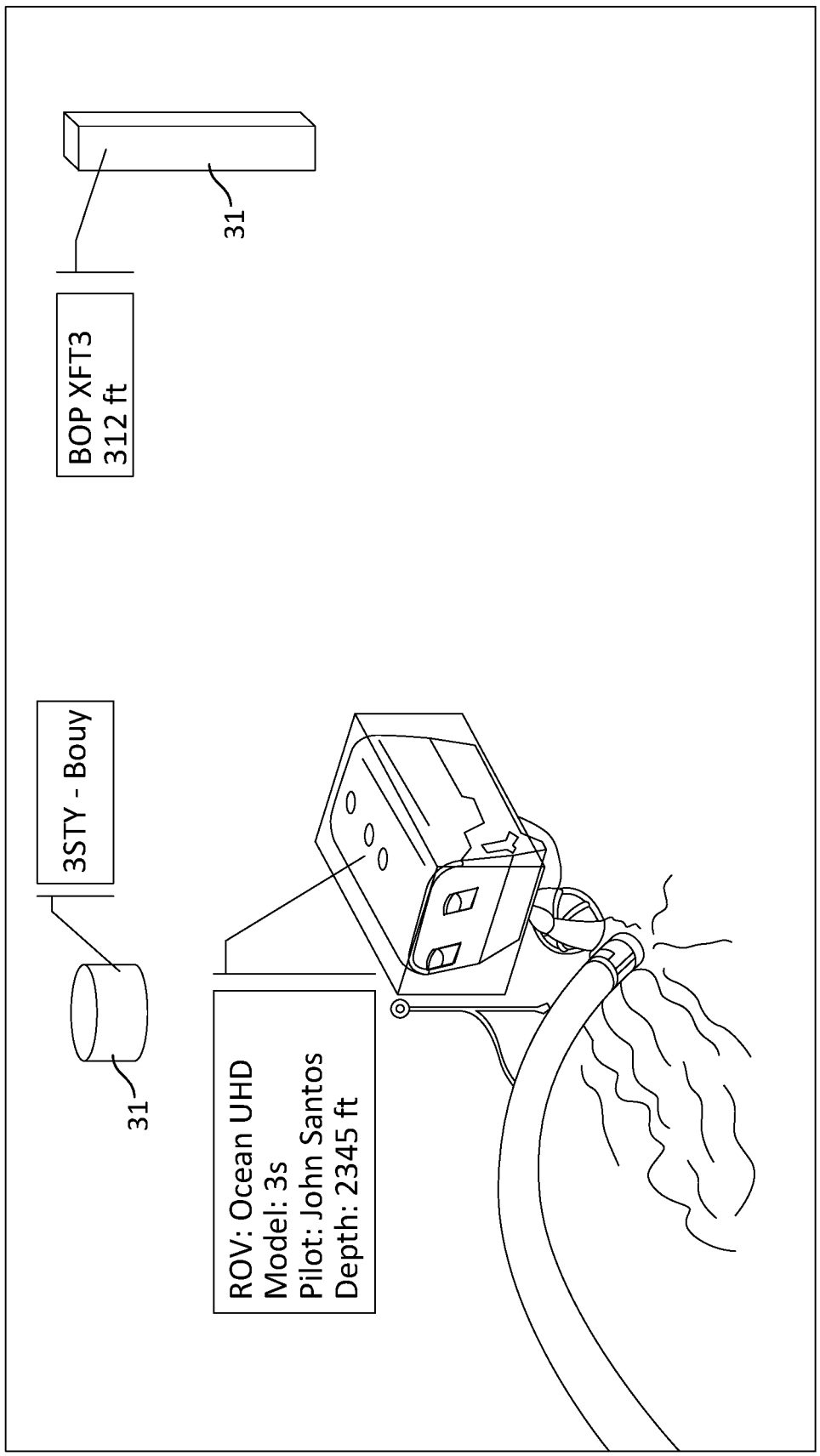

FIG. 6A illustrates the superposition of textual information and symbols 30 onto the 2D video rendering of the ROV user interface. FIG. 6B illustrates the superposition of 3D elements 31 onto the video rendering. The superposition of these data onto the video feed is useful, not only for navigating and controlling the ROV 1, but also for executing the related planning and supervising functions of the operating system 3. This superposition may be accomplished in a similar way to the superimposition of the video feeds, i.e., by obtaining screen coordinates of an object, and rendering text and numbers near those coordinates.

The planning module enables engineers and/or supervisors to plan one or several ROV missions. Referring again to FIG. 6A, an important feature of the planning module is the input and presentation of bathymetry information 32 through 3D visualization. As seen on the Navigation Interface, waypoints 33 and checkpoints 34 are superimposed onto the video feed. These elements may be identified, for example, by number, and/or by distance from a reference point. In other words, in addition to superimposing the technical specifications and status information 30 for the ROV 1 or other relevant structures, the Navigation Interface also provides GPS-determined positions for navigation and pilot information.

In some embodiments, procedures 35, including timed procedures (fixed position observation tasks, for example), may be included on the Navigation Interface as text. Given this procedural information, a ROV pilot is enabled to anticipate and complete tasks more accurately. A user may also use the system to define actionable areas. Actionable areas are geopositioned areas in the undersea environment that trigger a system action when entering, leaving, or staying longer than a designated time. The triggered action could be an alarm, notification, procedure change, task change, etc.

Figure 6C:
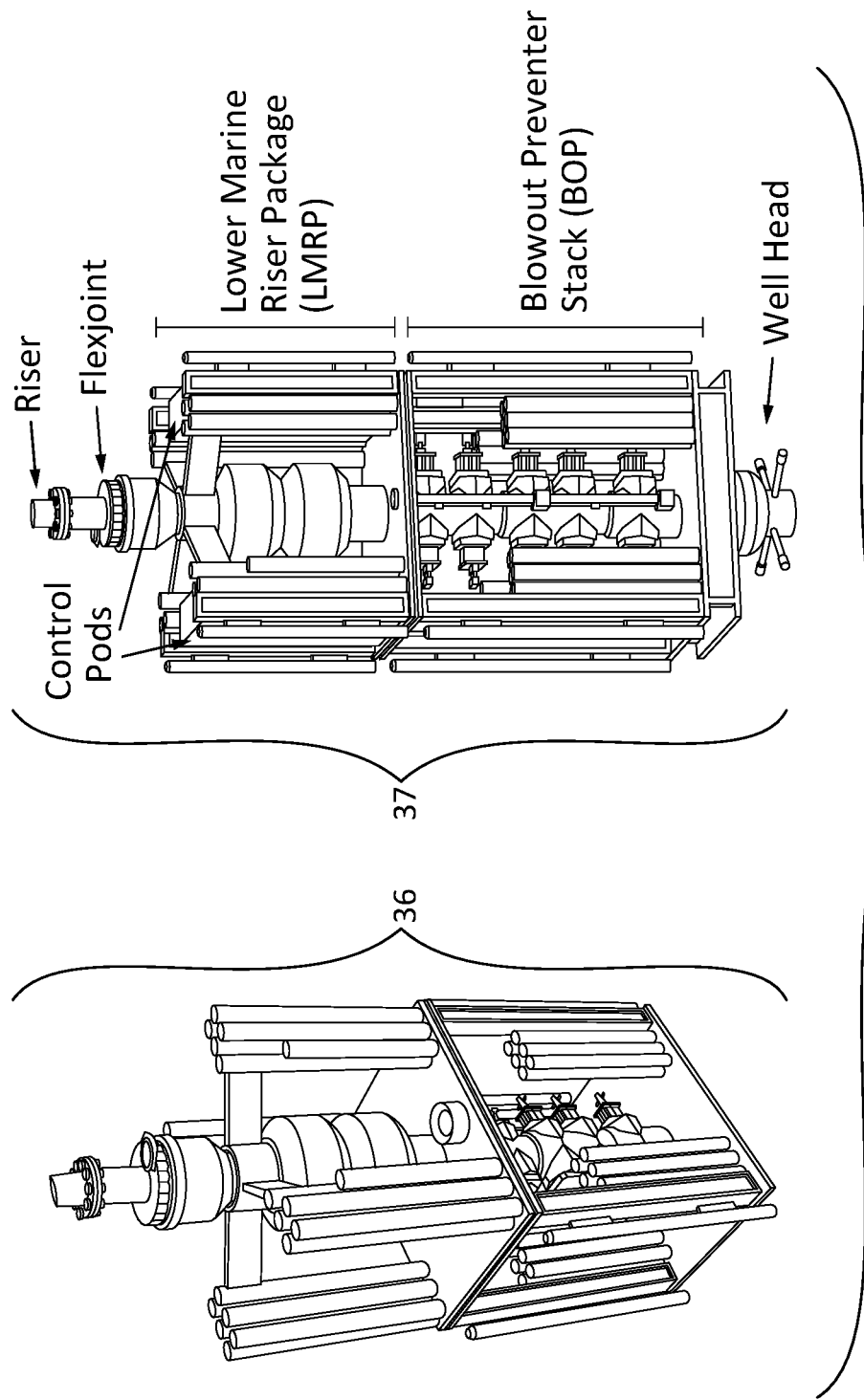

Referring to FIG. 6C, using a series of rules established in the planning module, or by manual input, the system may show more or less 2D geo-tagged information on the Navigation Interface. For example, as seen at 36, during a ROV operation when the pilot is at 100 meters from a geo-tagged object, the system may show only general information relating to the overall structure, or specific information needed for a specific current task in the nearby area. As the pilot approaches the geo-tagged structure, shown at 37, the system may incrementally show more information about components of that structure. This dynamic and manual level of detail control may apply to both textual and symbolic information 30, as well as to the augmentation of 3D elements 31.

Figure 6D:
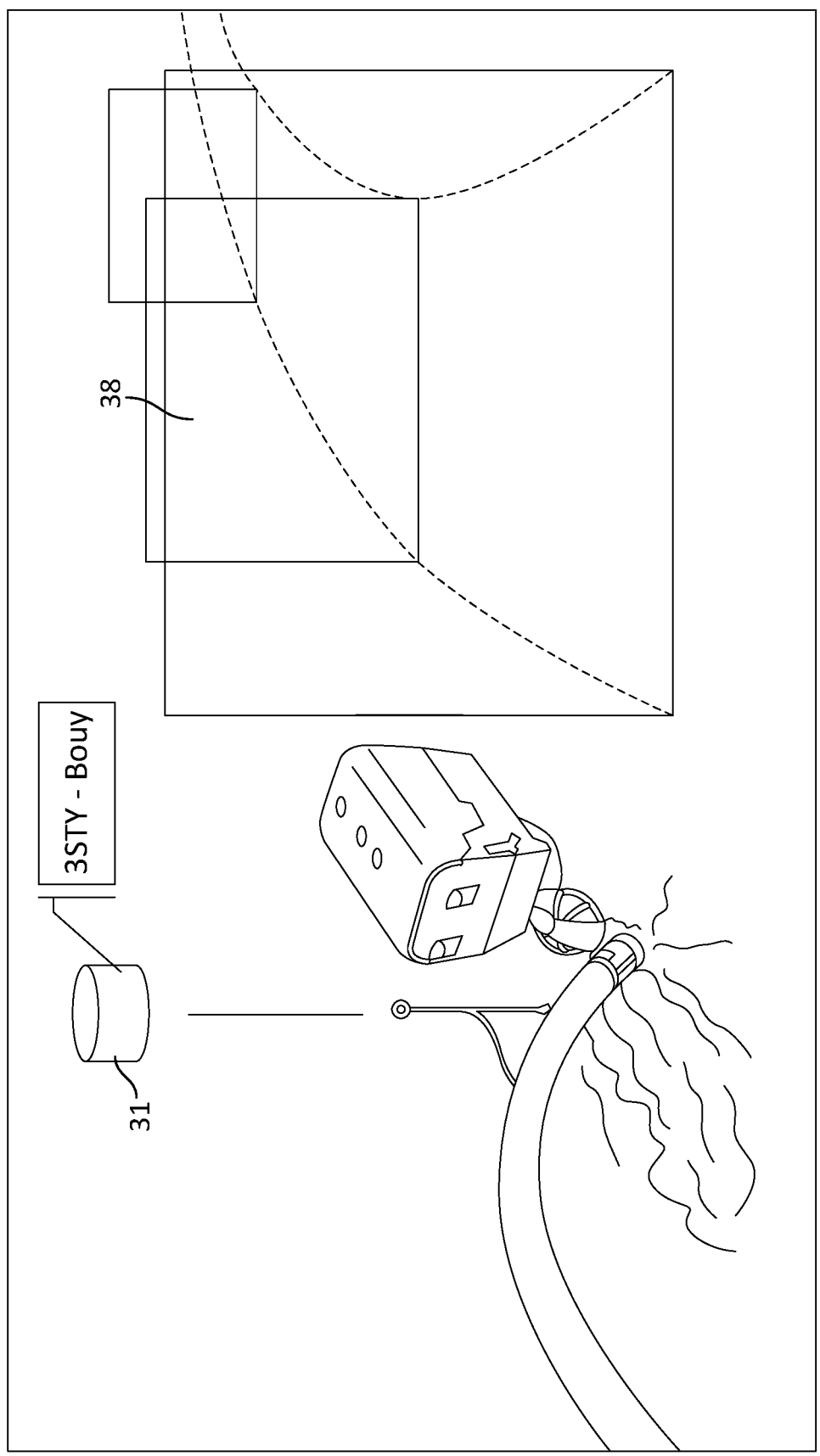
Figure 6E:
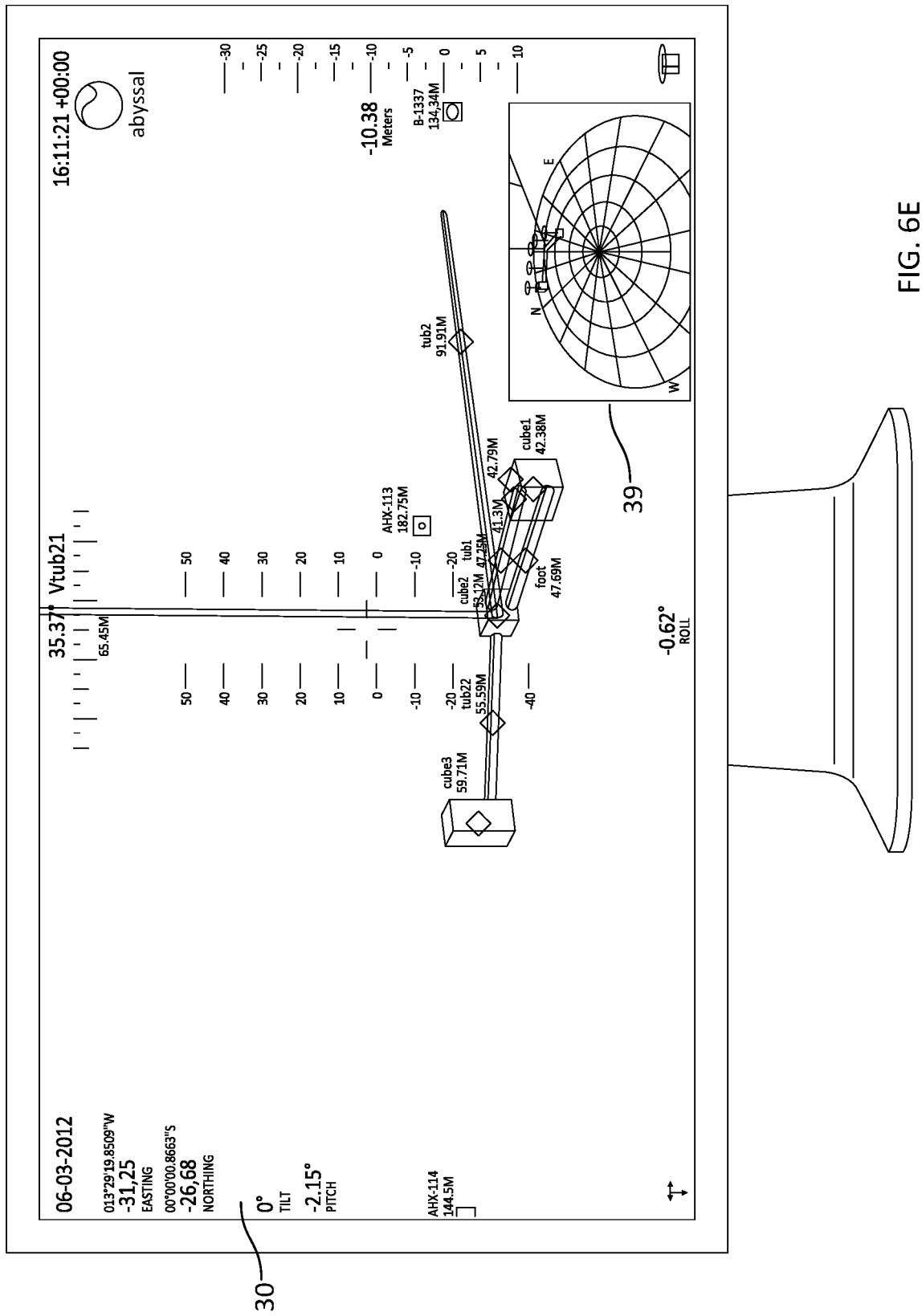

With reference to FIG. 6D, the planning module may also provide on-screen information relating to flight path 38. As seen in FIG. 6E, another important feature of the invention is embodied by a minimap 39, i.e., a graphic superimposed on the video, which may include a variety of different representations, such as small icons representing target objects. The minimap 39 may show the cardinal points (North, South, East, West) in a 3D representation, optionally in addition to a representation of a relevant object in tridimensional space. The minimap 39 may be positioned in a corner, and may be moved, dismissed and recalled by the user.

Data Engine

The data engine, which mediates the data warehousing and data transfer functions of the invention, therefore incorporates the logging and supervising modules.

The logging module logs or records all information made available by the operating system and saves such data in a central database for future access. The available information may include any or all telemetry, sonar data, 3D models, bathymetry, waypoints, checkpoints, alarms or malfunctions, procedures, operations, and navigation records such as flight path information, positioning and inertial data, etc.

An essential part of any offshore operation providing critical data to the client after the operation is concluded. After the operation, during the debriefing and reporting stage, the debriefing and reporting module may provide a full 3D scenario or reproduction of the operation. The debriefing and reporting module may provide a report on the planned flight path versus the actual flight path, waypoints, checkpoints, several deviations on the plan, alarms given by the ROV, including details of alarm type, time and location, procedures, checkpoints, etc. ready to be delivered to the client. Accordingly, the operating system is configured to provide four-dimensional (three spatial dimensions plus time) interactive reports for every operation. This enables fast analysis and a comprehensive understanding of operations.

Yet another software element that interacts with of the Navigation Interface is the supervisor module. Execution of the supervisor module enables one or more supervisors to view and/or utilize the Navigation Interface, and by extension, any ROV 1 being controlled from the interface. These supervisors need not share the location of the ROV pilot or pilots, but rather may employ the connectivity elements depicted in FIGS. 3B and 3C. A plurality of multi touch supervision consoles may be used at different locations. For example, one could have nine monitors connected to three exemplary hardware structures, including an ROV 1, where only one operating system 3 gathered the ROV data and shared information with the others. Alternatively, between one and 12 networked monitors may be used, and preferably between 3 and 9 may be used. Networking provided as shown in FIGS. 3B and 3C may reduce risks, such as human error, in multiple-ROV operations, even those coordinated from separate vessels. Networking through the supervisor module allows for the sharing of information between ROV systems, personnel and operations across the entire operation workflow.

Threat Detection Engine

As discussed herein with respect to FIGS. 1B and 3A, the operating system's 3 visualization engine further includes modules for implementing 3D imagery, implementing 2D imagery, and providing a real-time environment update. These modules are shown in FIG. 4, which illustrates how the system operates in some embodiments to create superimposed hybrid 3D imagery with a visualization engine using a 3D database module 10, a virtual video generation module 11, a synchronization module 12, and a superimposition module 13.

According to some embodiments, yet another feature of the operating system 3 is the threat detection engine that detects integrity threats in structures, such as underwater structures, and segments the structures in an image using convolutional neural networks ("CNN"). Generally, the threat detection module may receive videos from the ROV, write to the logs (e.g., data logging), and display warnings in the user interface. This feature is further described and shown with respect to FIG. 7.

Figure 7:
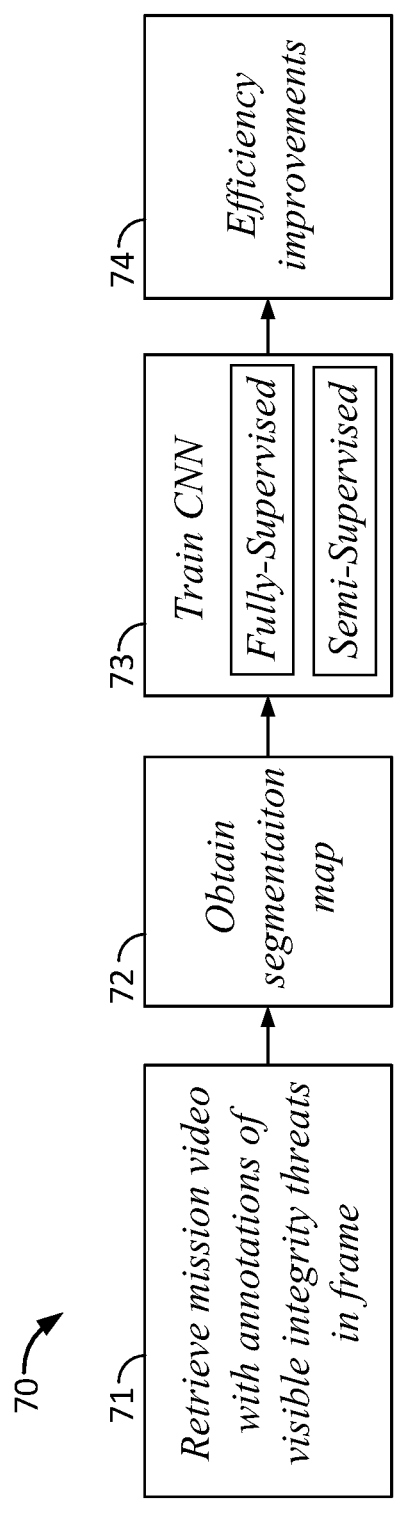
FIG. 7 illustrates a block-diagram overview of a threat detection engine, according to some embodiments.

FIG. 7 illustrates a block-diagram overview of a threat detection engine 70 that includes a dataset module 71, a segmentation map module 72, a CNN training module 73, and an efficiency module 75.

The threat detection engine 70 may train a deep learning model to detect anomalies in videos. To do so, a dataset module 71 with videos may be used where the dataset module 71 includes annotations detailing at what timestamps one or more anomalies are visible. The dataset module 71 may be part of, operate in a similar manner to, or use, the data engine and/or database 5 described herein (and shown in FIGS. 1B & 3A). The dataset module 71 may retrieve videos, such as videos of past missions. Those videos may have annotations in given frames. In some embodiments, the videos may have annotations that indicate whether an integrity threat exists in a given frame.

The segmentation map module 72 may use the virtual video (e.g., virtual video 20) to obtain the segmentation maps. A segmentation map is a matrix where, for each pixel of a given frame, the matrix contains a 1 when that pixel belongs to a structure and a 0 when that pixel does not belong to a structure.

The CNN training module 73 may use the data from the dataset 71 and the segmentation map module 72 to train a CNN model. In some embodiments, the CNN training module 73 may train a CNN model that predicts if there is an integrity threat in a given image, predicts a coarse segmentation map of the structures present in the image, or both. In some embodiments, the segmentation maps coming from the segmentation map module 72 are not mandatory. Consequently, in some instances, the CNN model will be trained with supervision on the segmentation maps and, in other instances, the CNN model will be trained without supervision on the segmentation maps. Thus, the CNN model is trained in a semi-supervised manner with respect to the segmentation maps.

The threat detection engine 70 may use a CNN training module 73 to train a CNN model that accepts an input frame (or input image) and outputs a 1 (or logic high) if a visible anomaly is detected and outputs a 0 (or logic low) otherwise. This type of CNN usually requires vast amounts of data to work since the model learns from scratch. In some embodiments, the threat detection engine 70 can improve the efficiency of training the CNN model by using smaller datasets and by forcing the model to search for anomalies inside structures, such as underwater structures, which enables the model to learn from smaller datasets (and thus is a technical efficiency improvement).

A basic CNN model (such as that depicted in FIG. 8) consists of several stacked Convolutional Layers. Each subsequent Convolutional Layer takes into account a larger region of the input image until it reaches the output that should take into account the full image. The region of the input image that the CNN takes into account may be referred to as the receptive field.

In some embodiments, $z_i$ is the output of the $i^{th}$ Convolutional Layer which is a tensor with height $h_i$, width $w_i$ and $k_i$ features. The threat detection engine 70 may generate a 1×1 Convolutional Layer followed by a sigmoid activation function on top of $z_i$ to obtain a $h_i \times w_i \times 1$ binary mask m. This binary mask may be a coarse structure segmentation map with values set to 1 when a structure is visible in its receptive field and 0 otherwise.

Having this coarse structure segmentation map allows the threat detection engine 70 to discard features that were extracted from regions outside structures by multiplying $z_i$ with m: $z_i'=z_i \times m$. Then, the threat detection engine 70 inputs $z_i'$ to the $(i+1)^{th}$ Convolutional Layer. The threat detection engine may then train the full model jointly, for example, with Backpropagation and Stochastic Gradient Descent, to minimize a loss function $L_a$ between its output and the ground-truth binary value of having or not an integrity threat in the image.

However, by training the model in this way the threat detection engine 70 is not forcing m to detect structures. To detect structures, the threat detection engine 70 requires a dataset where each frame is annotated with a coarse structure segmentation map. With this dataset it is possible to apply a loss function $L_m$ to provide supervision on the structure map.

For previous systems, gathering segmentation maps was often a vary laborious process. In contrast, using embodiments of the invention described herein, the threat detection engine 70 may use the segmentation map module 72 to gather the segmentation maps by using the systems and methods described herein. For example, a ROV 1 with a video camera using the operating system 3 can be used such that a 3D scene of the field is built and, given the ROV's position and camera direction, the 3D models of the visible structures can be superimposed on the ROV's camera (e.g., by using the visualization engine and the superimposition module 13). In some embodiments, only the virtual image is generated. The 3D models of the visible structures are projected into a virtual image, such as virtual video 20, given the ROV's position and direction.

Using this embodiment, efficiency is improved because only the 3D objects that belong to the structures are projected, instead of projecting all 3D objects (e.g., structures, other ROVs, waypoints, flight paths, etc.). By projecting the structures into the ROV's camera, the threat detection engine 70 may generate pixel-level structures' segmentations and use those pixel-level structures' segmentations to build the segmentation map dataset.

The threat detection engine 70 may train the CNN model to minimize a loss function, such as the following loss function:

$$L = L_a + L_m$$

Figure 8:
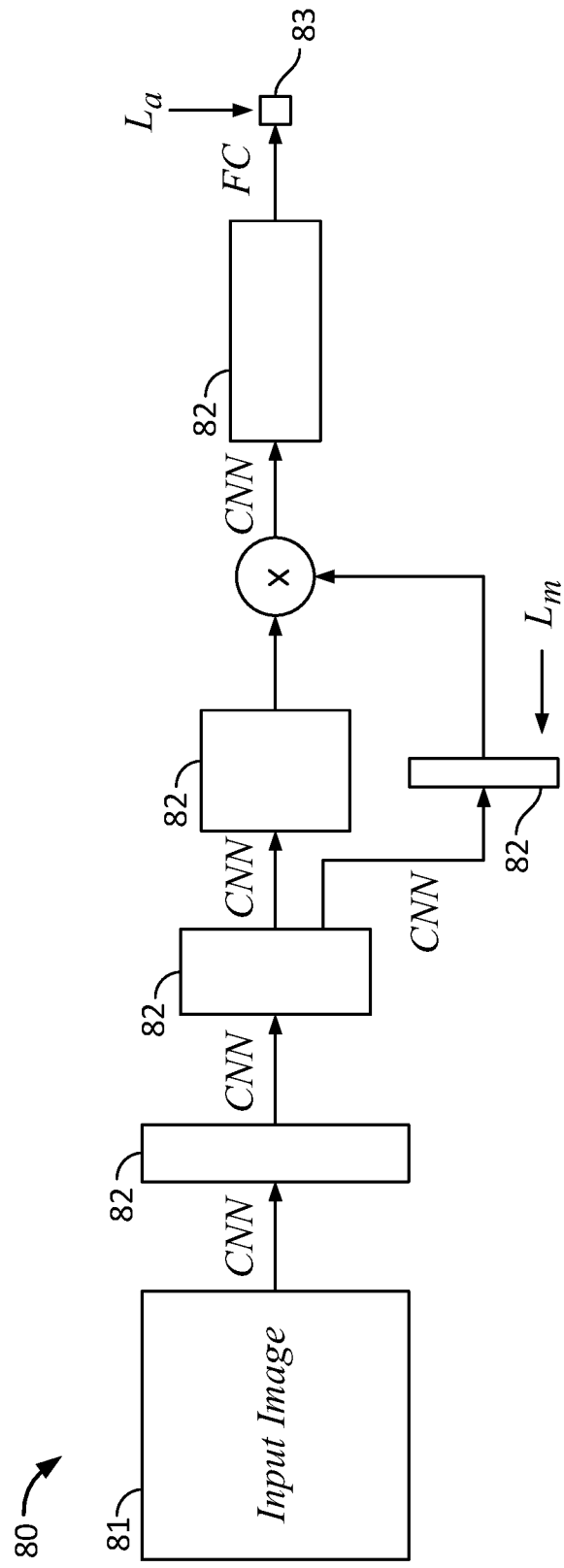
FIG. 8 depicts an architecture for a basic CNN model, according to some embodiments.

FIG. 8 depicts an architecture for a basic CNN model, according to some embodiments. FIG. 8 shows a CNN model 80, an input image 81, stacked convolutional layers 82, losses ($L_a$ and $L_m$), and fully-connected layer ("FC") 83. FC83 is a neural network layer that may be used to predict if there is an integrity threat in an image, given the features extracted by the convolutional layers. Each subsequent stacked convolutional layer 82 takes into account a larger (or different) region of the input image. The CNN model may be designed such that the stacked convolutional layers 82 take into account the full input image at the output of the CNN model. As shown in FIG. 8, the loss is applied at two different layers of the model.

The threat detection engine 70 may improve the segmentation map prediction accuracy. Data gathered according to embodiments of the invention provides higher accuracy for threat detection purposes because the threat detection engine 70 has both segmentation data and anomaly ground-truth data. Ground-truth data refers to the correct value for a given example. In this embodiment, there are two examples of ground truth data. Integrity threat ground-truth data may be logic 1 if there is an integrity threat in the image and logic 0 otherwise. Structure segmentation ground-truth data may be logic 1 if a pixel (e.g., a pixel of the input image) relates to a structure and logic 0 otherwise. Thus, for data gathered by the threat detection engine 70 for a given frame, a fully supervised CNN model may use the loss function L and a semi-supervised CNN model may use the loss function $L_a$. On the other hand, by only using data that was gathered using the system described herein, the system may be losing access to videos and data from other systems that only have integrity threat ground-truth data (i.e., does not contain structure segmentation ground-truth data). Thus, when the segmentation module 72 is not able to produce segmentation maps for a given frame, the CNN training module 73 will use the loss function $L_a$. In this case (i.e., when only integrity threat ground-truth data is available, but segmentation ground-truth data is not available), the error back-propagated by $L_a$ is used to improve coarse segmentation m and, thus, this data may be used to improve the segmentation model.

The threat detection engine 70 may improve efficiency with an efficiency module 74. In order to deploy a system in a real time scenario, speed is very important. Thus, in some embodiments, the efficiency module 74 may run CNNs on GPUs to leverage their mass parallel computation capabilities. Additionally or alternatively, in some embodiments, the efficiency module 74 may compute binary mask m and, if all its elements are close to zero, the efficiency module 75 may stop the threat detection engine from making further computations and generate an output that there are not structure anomalies. This is based at least in part on the reasoning that if there are no structures in the image, then there are no structure integrity threats.

Thus, there has been shown and described a system and method relating to automatic threat detection for structures. The method and system are not limited to any particular hardware or software configuration. The many variations, modifications and alternative applications of the invention that would be apparent to those skilled in the art, and that do not depart from the scope of the invention are deemed to be covered by the invention.

What is claimed is:

1. A system for operating a remotely operated vehicle (ROV) comprising:
   a database module of 3D elements operable to represent objects disposed in an operation environment of the ROV;
   a virtual video generating module operable to generate a virtual video incorporating the 3D elements;
   a video camera mounted to the ROV operable to generate a real video of the operation environment of the ROV;
   a synchronizing module operable to synchronize an angle and position of a virtual camera with an angle and position of the video camera mounted to the ROV;
   a visualization engine operable to superimpose the real video on the virtual video to create hybrid 3D imagery; and
   a threat detection engine operable to detect an integrity threat in a structure from the hybrid 3D imagery and segment the structure in the hybrid 3D imagery, the threat detection engine comprising:
   a convolutional neural network (CNN) training module comprising a semi-supervised dataset and a supervised dataset, wherein the semi-supervised data includes at least a portion of the real video, and wherein the supervised dataset includes at least a portion of the real video and at least a portion of the virtual video;
   a segmentation map module; and
   an efficiency module.

2. The system of claim 1, wherein the CNN training module includes a timestamp for an image with an anomaly from the real video.

3. The system of claim 2, wherein the CNN training module analyzes the image and either outputs a logic high if the anomaly is detected or outputs a logic low otherwise.

4. The system of claim 3, wherein the CNN training module comprises a plurality of stacked convolutional layers, wherein each subsequent stacked convolutional layer of the plurality of stacked convolutional layers includes a larger region of the input image.

5. The system of claim 4, wherein the CNN training model further comprises a coarse structure segmentation map.

6. The system of claim 5, wherein the segmentation map module generates a segmentation map dataset using pixel-level segmentations.

7. The system of claim 6, wherein the segmentation map module generates the pixel-level segmentations by projecting a 3D model of a visible structure into the ROV's virtual camera.

8. The system of claim 7, wherein the CNN training module trains a CNN model to minimize a loss function.

9. The system of claim 8, wherein the CNN training module (i) uses a loss function L for data that contains both segmentation data and anomaly ground-truth data and (ii) uses a loss function La for data that contains anomaly ground-truth data but not segmentation data.

10. The system of claim 9, wherein the efficiency module computes a binary mask m and, when all of m's elements are close to zero, the efficiency module stops the threat detection engine from making further computations and generate an output that there are not structural anomalies.

11. A system for undersea exploration comprising:
a remote operated vehicle (ROV) comprising a camera for acquiring a real video;
a networked operating system comprising a computer and computer executable software comprising a visualization engine and a threat detection engine;
a database module of 3D elements operable to represent objects disposed in an operation environment of the ROV;
a virtual video generating module operable to generate a virtual video incorporating the 3D elements;
a video camera mounted to the ROV operable to generate a real video of the operation environment of the ROV;
a synchronizing module operable to synchronize an angle and position of a virtual camera with an angle and position of the video camera mounted to the ROV;
wherein the visualization engine is operable to superimpose the real video on the virtual video to create hybrid 3D imagery; and
wherein the threat detection engine is operable to detect an integrity threat in a structure from the hybrid 3D imagery and segment the structure in the hybrid 3D imagery, the threat detection engine comprising:
a convolutional neural network (CNN) training module comprising a semi-supervised dataset and a supervised dataset, wherein the semi-supervised data includes at least a portion of the real video, and wherein the supervised dataset includes at least a portion of the real video and at least a portion of the virtual video;
a segmentation map module;
an efficiency module; and
a navigation interface configured to display the hybrid 3D imagery, the navigation interface comprising at least one networked monitor.

12. The system of claim 11, wherein CNN training module includes a timestamp for an image with an anomaly from the real video.

13. The system of claim 12, wherein the CNN training module analyzes the image and outputs a logic high if a visible anomaly is detected and outputs a logic low otherwise.

14. The system of claim 13, wherein the CNN training module comprises a plurality of stacked convolutional layers, wherein each subsequent stacked convolutional layer of the plurality of stacked convolutional layers includes a larger region of the input image.

15. The system of claim 14, wherein the CNN training model further comprises a coarse structure segmentation map.

16. The system of claim 15, wherein the segmentation map module generates a segmentation map dataset using pixel-level segmentations.

17. The system of claim 16, wherein the segmentation map module generates the pixel-level segmentations by projecting a 3D model of a visible structure into the ROV's virtual camera.

18. A method of operating a remotely operated vehicle (ROV) comprising:
obtaining 3D data;
storing 3D elements in a database module, the 3D elements representing objects disposed in the ROV's operation environment and comprising the 3D data;
generating a virtual video of the 3D elements;
synchronizing an angle and position of a virtual camera with an angle and position of a video camera mounted to the ROV; and
aligning and superimposing a virtual video element with a real video element to create hybrid 3D imagery;
segmenting a structure from the hybrid 3D imagery;
training a CNN model with a semi-supervised dataset and a supervised dataset, wherein the semi-supervised data includes at least a portion of the real video, and wherein the supervised dataset includes at least a portion of the real video and at least a portion of the virtual video; and
detecting an integrity threat in the structure from the hybrid 3D imagery.

19. The method of claim 18, wherein detecting an integrity threat further includes
generating segmentation maps.

20. The method of claim 19, wherein detecting an integrity threat further includes:
generating a segmentation map dataset using pixel-level segmentations;
computing a binary mask m; and
stopping further computations when all of m's elements are close to zero.

* * * * *